(12) United States Patent
Jacobson, Jr. et al.

(10) Patent No.: US 7,402,983 B2
(45) Date of Patent: Jul. 22, 2008

(54) METHOD FOR USE OF CHARGE-TRANSFER APPARATUS

(75) Inventors: Wells Case Jacobson, Jr., Princeton, NJ (US); Mark Holveck, Princeton, NJ (US)

(73) Assignee: Princeton Power Systems, Inc., Princeton, NJ (US)

( * ) Notice: Subject to any disclaimer, the term of this patent is extended or adjusted under 35 U.S.C. 154(b) by 313 days.

(21) Appl. No.: 11/348,919

(22) Filed: Feb. 6, 2006

(65) Prior Publication Data
US 2006/0208707 A1  Sep. 21, 2006

Related U.S. Application Data

(60) Provisional application No. 60/650,210, filed on Feb. 4, 2005.

(51) Int. Cl.
*G05F 1/70* (2006.01)
*H02M 1/12* (2006.01)

(52) U.S. Cl. ................... 323/214; 363/39; 307/109; 323/288

(58) Field of Classification Search ............ 363/39–47, 363/140; 323/212, 218, 288; 307/109; 320/166; 324/691, 704; 341/172
See application file for complete search history.

(56) References Cited

U.S. PATENT DOCUMENTS

| | | | | |
|---|---|---|---|---|
| 4,070,666 | A | * | 1/1978 | Butler et al. ............. 341/172 |
| 4,816,745 | A | * | 3/1989 | Schneider ............... 324/704 |
| 5,986,907 | A | * | 11/1999 | Limpaecher ............. 363/140 |
| 6,118,678 | A | * | 9/2000 | Limpaecher et al. ........ 307/109 |

* cited by examiner

*Primary Examiner*—Jessica Han

(57) ABSTRACT

A method for controlling a switching power converter which includes a central capacitor exchanges charge between the capacitor and plural nodes of a first terminal, and then transfers the charge between the capacitor and plural nodes of a second terminal. The charge interchanged between the capacitor and the nodes establishes the amount of power transferred during each cycle. The charge which is interchanged is controlled by selecting the electrical phase between the currents drawn from the nodes and the voltages at the nodes.

4 Claims, 13 Drawing Sheets

METHOD FOR USE OF CHARGE-TRANSFER APPARATUS

CROSS REFERENCE TO RELATED APPLICATIONS

This application claims the benefit of the priority date of provisional patent application 60/650,210, filed Feb. 4th, 2005 in the name of Mark Holveck and Wells Case Jacobson.

FIELD OF THE INVENTION

The present invention relates generally to the field of electric power conversion, and, more particularly, to a charge-transfer apparatus and method for alternating-current to alternating-current (AC-to-AC) power conversion, alternating-current to direct-current (AC-to-DC) rectification, DC-to-AC inversion, DC-DC power conversion, and volt-ampere-reactive (VAR) control. Although the invention is subject to a wide range of applications, it is especially suited for use in power distribution and transmission systems in electric utility, industrial, commercial, and marine applications.

BACKGROUND OF THE INVENTION

Standard AC-to-DC rectification apparatus using non-linear devices, for example, diode or thyristor bridges, cause harmonics and reactive power on a three-phase AC power supply providing electrical power to the apparatus. The harmonics and reactive power are caused by the uneven loading of the input phases. That is, current is drawn from the phase when the input AC phase voltage is greater than the output DC voltage, and no current is drawn from a phase when the input AC phase voltage is less than then the output DC voltage.

With the proliferation of variable-speed motor drives and back-up power sources, which typically require an AC-to-DC then DC-to-AC conversion to obtain the desired AC motor voltage and frequency, further distortion of the waveform of the AC power supply arises. As the waveform of the power supply, such as the electric utility grid or a generator on a marine vessel, deteriorates, malfunctions can occur to equipments that depend on a "clean" source of power for proper operation.

U.S. Pat. No. 6,118,678, issued Sep. 12, 2000 in the name of Limpaecher et al. describes a power conversion apparatus, and a method therefore, that reduces distortion of the waveform of the AC power supply. The Limpaecher et al. patent describes a system which tends to address this need. The Limpaecher et al. system includes a resonant charge-transfer apparatus (RCTA), and a differential and sequential resonant charge-interchange (DSCI) method therefore. The RCTA and DSCI method of Limpaecher et al. is said to provide advantages over known power-conversion apparatus, in that it reduces distortion of the waveform of the AC power supply, among other things. The RCTA reduces this problem by drawing charge from all phases of a multi-phase power supply in proportion to the ratio of the current of the input phases. This yields harmonic-free power, draws power at unity power factor, and does not introduce reactive power into the AC power supply. Furthermore, because the RCTA can be bi-directional, it can inject harinonic-free current at the fundamental frequency into the multi-phase AC power supply, as well as synthesize a sinusoidal current waveform with a desired frequency and phase into a load such as a motor.

According to the Limpaecher et al. patent, the RCTA operates in two cycles. First, a desired charge is drawn from each phase of a power supply to charge an energy storage device. Second, the charge on the energy storage device is discharged through the output of the RCTA. Through many cycles of operation per second, the RCTA can extract charge from the power source and inject the charge through the output of the RCTA to construct a desired output waveform. The cyclic transfer of charge may or may not provide a net energy transfer to or from the source power supply. With repeated charge interchanges, a net and controlled power flow can occur from an input terminal of the RCTA to an output terminal; or the repeated charge interchange can provide controlled reactive power of an AC power supply. The power applied to the RCTA may be either multi-phase AC or DC. The output waveform which is produced can be either multi-phase AC having a desired voltage and frequency or DC having a desired voltage level and polarity. Conversion can be from AC to AC or to DC, or from DC to AC or to DC. For power flow control, the charge interchange occurs, in most applications, by a charge interchange between the power source and the charge storage device followed by a charge interchange between the charge storage device and the output or load. However, a direct power flow between the input terminal and the output terminal can be provided. By controlling the charge interchange process, current can be drawn from, or injected into, a terminal; and, if averaged with a low-pass filter, yield practically ripple-free current flow.

According to the Limpaecher et al. patent, an advantage of this RCTA apparatus and method is that it can utilize high-power thyristors (when unidirectional, also known as Silicon Controlled Rectifiers or SCRs, and when bidirectional, also known as triacs) that operate or perform switching in a self- or natural-commutation mode. Thus, it does not require the opening or rendering nonconductive of switches, such as occurs in pulse-width modulator (PWM) inverters using insulated-gate bipolar transistors or gate turn-off devices. Consequently, a circuit to control the opening of switches is not required. The arrangement of the Limpaecher et al. patent can use conventional thyristors, which have been in use for about 35 years. Unlike many conventional power electronic circuits, the power electric components utilized in the Limpaecher et al. patent are currently available and need not be developed. Also, these thyristors tend to have the highest voltage rating, highest current rating, and/or one of the lowest forward voltage drops of any power electronic switch. These devices also have low losses, are inexpensive, and are available with both high-voltage and high-current ratings. Thus, the Limpaecher et al. RCTA can be scaled up with present technology for high-power and high-voltage applications. There are many applications for the RCTA and DSCI method. For example, the RCTA can be utilized in an AC-to-AC converter with power transfer occurring without the typical intermediate DC link. It can also be utilized as an AC-to-DC rectifier, DC-to-AC inverter, DC-to-DC converter, multi-port converter, harmonic compensator, VAR compensator, and electronic transformer.

A feature of the RCTA, as stated in the Limpaecher et al. patent, is the harmonic-free conversion of multi-phase AC power to either multi-phase AC or DC. This is achieved by extracting charge from all of the phases in proportion to ratio of the current of the input phases by differentially charging the charge storage device from two input phases, followed by the replacement of one of the two phases by a third phase (referred to as "differential and sequential resonant charge-interchange" (DSCI)). Performing the charging at controlled intervals loads the multi-phase AC power supply to the desired power level at any part of the AC cycle. Uniform loading of the multi-phase AC power supply maintains a balanced and constant power. Through controlled charging, current can be drawn from the input that is in-phase with the input voltage, and thus the input power has a unity power factor. This, in turn, eliminates the requirement for phase-angle corrections or VAR capacitors at the input of the RCTA. This technique is not restricted to a three-phase AC power system, but may be extended to any multi-phase system.

According to Limpaecher et al., the AC-to-AC converter can synthesize the output frequency and phase by controlled discharging. Further, the AC-to-AC converter can transfer energy from the AC power supply to an AC terminal that has its frequency and phase determined by another AC power source, such as a generator. The injected charge can be in phase with the voltage of the other AC power source to transfer real AC power. As an alternative, the injected charge can contain a fraction of charge that is out-of-phase with the voltage of the other AC power source, such that the power transfer contains reactive power. This operating mode permits controlled power transfer from one AC power source to another AC power that have different phase, voltage, and frequency. According to Limpaecher et al., an application of the AC-to-AC converter is the controlled operation of power transfer between systems of (at) different voltages. This permits controlled power flow to a system that may experience voltage, phase, and frequency instability. For example, the AC-to-AC converter may be used on the electric utility grid as a gateway controller to control the desired power flow. The gateway controller can control the power flow through an AC transmission line and limit the power flow to lie within the thermal limit of the transmission lines. The gateway controller can also be used to transfer power from one regional AC power system to an adjoining AC power system. This could replace the utilization of DC link between the Eastern, Western, Texas, Mexican, and Canadian regional grids. In another application, the gateway controller can control the power flow to damp the sub-harmonic instability of a regional AC grid. Yet another application of the AC-to-AC converter is to convert the frequency of the AC power supply to a different output frequency. This feature has many possible applications, one being for the use of variable speed motor drives. The AC-to-AC converter can dynamically control the voltage, frequency, phase, real power, and reactive power to the motor on a continuous basis over a specified range. Since the AC-to-AC converter can be controlled for bi-directional power flow, the motor can be also controlled for dynamic braking for full four-quadrant operation.

In a still further possible application mentioned by Limpaecher et al., the RCTA can be an electronic transformer with output voltage regulation, frequency change, and phase control capabilities with a single-phase transformer inserted into either the charge or discharge cycle. The input and output may be either DC or AC. In this mode, the single-phase transformer provides a greater input-to-output voltage ratio change over a large range than the prior AC-to-AC power converter. The single-phase transformer can be used to step-up or step-down the input voltage. Further, the single-phase transformer can be used to obtain full galvanic (conductive) isolation between the input and output terminals or ports. Because the single-phase transformer is located in the high frequency section of the electronic converter, the magnetic core size can be reduced by comparison with operation at a lower frequency. Further, a typical AC transformer is energized all the time independent of the load factor, significantly reducing the efficiency at low and average loads. In the present invention, the efficiency is relatively constant because the core of the transformer is only energized when throughput power is required. In this arrangement, the transformer may be part of the charging circuit, inserted between the input switches and the charge storage device, or it may be part of the discharge circuit, inserted between the charge storage device and the output switches. Insertion of a single-phase transformer permits the RCTA to be utilized as a regulated electronic transformer. When an AC power supply for a facility needs to be stepped down in voltage, the electronic transformer not only performs the voltage transformation, output voltage regulation, and VAR neutralization, but also acts as the electronic circuit breaker, eliminating the need for mechanical switchgear. Another possible application for the electronic transformer as set forth by Limpaecher et al. is as an interface between an AC power source and the AC grid. The power can be stepped up from the generator voltage to the transmission voltage. Because the generator does not have to operate at the AC grid power frequency, greater flexibility is obtained. For example, the power source may be a turbine, a wind power generator, or a hydroelectric power plant. It is well known that a significantly higher fraction of the power can be captured for both the wind and hydroelectric power plant if the generator is not forced to operate at a constant frequency. Still other possible implementations of the electronic transformer include an AC-to-DC step-down configuration for DC industrial processes and an AC-to-DC step-up of the output of an AC generator to DC for direct DC transmission.

According to Limpaecher et al., use of the DSCI technique for AC-to-DC power rectification allows the power throughput to be fully regulated to yield a highly regulated output with minimum DC output-voltage ripple. The energy in the charge storage device is resonantly discharged into the DC output terminal. In a preferred embodiment of Limpaecher et al., a three-phase AC power supply is applied to the input terminal of the RCTA and a DC output that is positive, negative, or bi-polar is outputted. Unlike standard bridge rectification techniques, no transformer isolation is required for a grounded system. In addition, several rectification modules may be operated in parallel with full individual power throughput control.

According to Limpaecher et al., a feature of the AC-to-DC rectifier is that the output polarity can be operated over a large DC-voltage range with nearly instantaneous polarity reversal. Also, unlike standard rectification processes in which the output voltage is limited to a maximum value depending on the AC-input voltage, the output of the RCTA can be significantly boosted, being limited only by the selection of the active and passive components. The boost capability is said to suggest that, for many operations, a constant output can be maintained even with a significant droop of the AC power source, even if the droop is on the order of one cycle in duration or exists over a prolonged period of time.

Limpaecher et al. mention several possible modes of voltage regulations, including (a) pulsed density modulation, by increasing or decreasing the number of charge and discharge cycles per selected time interval, (b) residual voltage regulation of the charge storage device, typically controlled as part of the discharge cycle of the charge storage device, (c) control of the charging energy of the charge storage device during the charging cycle, and (d) control of the discharge energy of the charge storage device during the discharging cycle. An important feature of the RCTD apparatus is that in all regulation options the majority of the regulation does not require the opening of electronic switches under load and falls under the category of "soft switching" operation. The RCTA can also be utilized in a DC-to-AC inverter by reversing the AC-to-DC operation. The DC-to-AC inverter retains the benefits set forth above for the AC-to-DC converter.

The DC-to-AC inverter, according to Limpaecher et al., can synthesize an AC power source with controlled voltage amplitude, constant or variable frequency, and selected phase angle. As an alternative, energy can be transferred from the DC power source to an AC terminal that has its frequency and phase determined by an AC power source. The DC-to-AC inverter can simultaneously deliver not only the real power, with the injected current being in phase with the voltage, but can also simultaneously generate reactive power, with the current either leading or lagging the AC voltage wave form.

One possible application mentioned by Limpaecher et al. that takes advantage of the dual modes of AC-to-DC rectification and DC-to-AC inversion is energy storage in a battery. Energy can be extracted from the AC input during AC power availability on an electric grid, and the stored energy can returned to the AC grid when power is required. Another possible application is for use with variable speed motors. The DC-to-AC operation can supply both the real and reactive power demand of the motor. The AC-to-DC operation would be applicable during the controlled dynamic breaking with the inverter delivering the real power to the DC power source.

The RCTA of Limpaecher et al. is said to be usable to connect more than two power terminals to the charge storage device to form a multi-port inverter. All of these ports may be conFIGUREd to have bi-directional power flow, and the ports can be or carry combinations of AC or DC, thereby permitting transfer of electric charge or energy from any of the ports to any other port. A transformer can be integrated into such a multi-port inverter, which could permit the connection of power terminals that are at different voltage levels. The multi-port inverter may have a large number of practical applications. Two input AC power buses may be used to provide a redundant power source, or a similar three-port configuration can be combined with a charge storage device to yield an uninterruptible power supply. Further, the RCTA is said to be useful as a static volt-ampere-reactive (VAR) controller, harmonic compensator, voltage regulator, or flicker controller.

FIG. 1 is a simplified schematic diagram of the physical structure of a charge transfer apparatus 10 such as that described at length in Limpaecher et al., incorporated herein by reference. In FIG. 1, apparatus 10 includes three input terminal connections 12$_1$, 12$_2$, and 12$_3$ of input terminal 12. The term "input" will be used to refer to the end of the converter with terminal 12, although the bi-directional power flow capability of the converter makes such a label arbitrary. Between input terminal 12 and a switching section 18 of FIG. 1 is input filter inductor section 14, consisting of input filter inductors 14$_1$, 14$_2$, and 14$_3$, and input filter capacitor section 16, consisting of input filter capacitors 16$_1$, 16$_2$, and 16$_3$. The switching section 18 of controllable input switches includes switches Si1$p$, Si1$n$, Si2$p$, Si2$n$, Si3$p$, and Si3$n$. Among the switches of section 18, Si1$p$, Si2$p$, and Si3$p$ conduct current in a first direction, and have their cathodes connected together at a first node 19$a$. Similarly, controllable switches Si1$n$, Si2$n$, and Si3$n$ conduct current in the opposite direction, and have their anodes connected to a second node 19$b$. A "central" capacitor 22 is connected between nodes 22$a$ and 19$b$. A charging inductor 20 is connected between nodes 19$a$ and 22$a$. A "freewheeling" diode or rectifier designated 24 has it anode connected to central capacitor terminal or node 22$a$, and its cathode connected to a node 25$a$. A freewheeling switch 26 has its anode connected to node 19$b$ and its cathode connected to node 25$a$. A discharging inductor 40 is connected between nodes 25$a$ and 27$a$. An output switch set 38 including controllable switches So1$p$, So2$p$, So3$p$, So1$n$, So2$n$, and So3$n$ connects nodes 19$b$ and 27$a$ to a set 36 of output filter capacitors 36$_1$, 36$_2$, and 36$_3$ and through a set 34 of output filter inductors 34$_1$, 34$_2$, and 34$_3$ to a three-phase load or voltage source 32, having terminal connections 32$_1$, 32$_2$, and 32$_3$.

A specific example of typical operation of the apparatus of Limpaecher et al., as described in Limpaecher et al., is useful for understanding the present invention. In Limpaecher et al. the apparatus is said to be able to converter power from AC to AC, AC to DC, DC to DC, or DC to AC, where the AC power can be of variable voltages and frequencies and the DC power can be of variable voltage and polarity. The specific example that follows here will take the AC-AC case, converting power between different voltage and frequency levels. In the example, the apparatus of Limpaecher et al. is used to draw power from a three-phase 60 Hz 480V voltage source on its input and inject power into a three-phase 50 Hz 240V voltage source on its output, according to the methods of Limpaecher et al. One skilled in the art will know that these voltages signify the root mean square (RMS) voltage differential between any two of the three phases of the given three-phase source. The device might be used to perform this power conversion for a variety of reasons, including drawing power from a utility grid to supply power to a smaller grid of lower voltage and different frequency, or drawing power from a generator voltage source such as a wind turbine generator and supplying power to a utility grid.

FIG. 2 shows an apparatus similar to the apparatus of FIG. 1, with a three-phase 60 Hz 480V voltage source connected to its input and a three-phase 50 Hz 240V voltage source connected to its output. According to the methods of Limpaecher et al., power is transferred between the input and the output of the apparatus through pulses of charge that are drawn from the input phases through switching section 18 to charge up the central capacitor 22 and then are injected into the output phases through switching section 38 to discharge the central capacitor. The charge is drawn from the input phases such that the charge drawn from each input phase during a pulse is proportional to the current desired on that input phase at the time of the pulse, and the charge is injected into the output phases such that the charge injected onto each output phase during a pulse is proportional to the current desired on that output phase at the time of the pulse.

For the example of FIG. 2, for power to be drawn at unity power factor from the input voltage source the desired currents on the three input phases must have a frequency of 60 Hz and be in phase electrically with the voltages on each of the three input phases, respectively. FIG. 3 shows a plot of the three voltages of the three-phase 60 Hz 480 V voltage source in Plot 3A, and possible desired currents in Plot 3B. According to Limpaecher et al., to get the desired currents on each phase pulses of charge are drawn from each phase at some pulse frequency that is significantly greater than the fundamental frequency of the desired currents and the pulses of charge are drawn from the three phases such that the ratio of charge drawn from each phase by a given pulse is the same as the ratio of the desired currents on that phase at the time that the given pulse occurs. For example, one such charge pulse might occur at the time $t_c$ shown in both plots of FIG. 3. As stated above, a charge pulse draws charge from the input phases onto the central capacitor 22 of FIG. 2 through the switching section 18 of FIG. 2, drawing the charge in such a way that it is distributed among the input phases in proportion to the desired current on those phases. At time $t_c$ of FIG. 3 the electrical phase angle of the three-phase voltage and desired current waveforms is approximately 101 electrical degrees (where for the purposes of this patent zero degrees is the positive zero crossing of the phase 1 waveform). The desired input phase currents, which will be referred to as Ii1, Ii2, and Ii3, are in a ratio of 1 to −0.33 to −0.67 respectively, and therefore, according to Limpaecher et al., the charge that flows onto the central capacitor must be drawn from the input phases such that phase 2 receives −0.33 times the charge of phase 1 and phase 3 receives −0.67 times the charge of phase 1. The voltages on phases 1, 2, and 3 at time $t_c$ are 385V, −128V, and −257V respectively, and they will be referred to as Vi1, Vi2, and Vi3, respectively. If the input filter inductor and filter capacitor sections 14 and 16 are small, they do not cause large magnitude or phase changes in voltage across the filter, and three approximately equal voltages to Vi1, Vi2, and Vi3 appear on phase legs $15_1$, $15_2$, and $15_3$ at the input to the switching section 18. According to Limpaecher et al., the central capacitor begins a charge cycle at some voltage, known as the residual voltage $V_r$, which will be taken here to be −500V. The switches of switching section 18 must be triggered in a way such that charge flows onto the central capacitor while being drawn in the correct ratios from the input phases. This is accomplished in the present example, according to the methods of Limpaecher et al., by first firing positive switch Si1$p$ of phase 1 and negative switch Si2$n$ of phase 2 at a time to, shown on FIG. 4. The closing of these switches applies the voltage Vi1-Vi2, equal to 513V, to the central resonant loop consisting of the charging inductor 20 and the central capacitor 22 of FIG. 2. The resulting voltage across the charging inductor 20 causes current to flow in the loop defined by the charging inductor 20, the central capacitor 22, the switch Si2$n$, the filter capacitors $16_2$ and $16_1$, and the switch Si1$p$. In Plot 4A of FIG. 4, the waveforms designated 4$c$ and 4$d$ represent the currents flowing in the direction of the arrows at $15_1$ and $15_2$ respectively on FIG. 2. The waveform designated 4$a$ represents the voltage of the central capacitor. During the period from to to $t_1$, charge flows onto the central capacitor and in input phase legs $15_1$ (positively) and $15_2$ (negatively). The central capacitor current is shown by current 4$b$ of Plot 4B. The central capacitor voltage increases as shown by voltage 4$a$. At some time $t_1$, the switch Si3$n$ is fired. The firing of this switch causes the voltage V3-V2, equal to −129V, to reverse bias the closed switch Si2$n$, and the current in switch Si2$n$ and phase leg 152 is driven to zero, as shown by waveform 4$d$ of FIG. 4. The current in the charging inductor 20 and the central capacitor 22 continues to flow in a new resonant loop that includes said inductor and central capacitor as well as switch Si3$n$, input filter capacitors $16_3$ and $16_1$, and switch Si1$p$. The voltage applied by the input filter capacitors to the central resonant section is now Vi1-Vi3, equal to 642V. During the period from t1 to t2, charge flows onto the central capacitor and in input phase legs 15, (positively) and $15_3$ (negatively). The current that was flowing in switch Si2$n$ has been replaced by current flowing in switch Si3$n$, represented by the current 4$e$ of FIG. 4. When the voltage on the central capacitor becomes greater than the voltage Vi1-Vi3 applied by the filter capacitors, the current in the charging inductor 20 begins to decrease, and is eventually driven to zero as a time t2 shown in FIG. 4. The central capacitor reaches an approximate voltage of 1700V.

This completes the charge process. The result of the charge process is that the central capacitor has been charged from some low voltage to some higher voltage, and the charge that flowed onto the central capacitor also flowed partially on each of the lines $15_1$, $15_2$, and $15_3$ of FIG. 2, drawing charge from the input phases. The time t1 can be selected correctly, according to the methods of Limpaecher et al., such that the charges flowing from each of the three input phases are in the same ratio as the desired current on those phases at the time $t_c$ of FIG. 3.

The discharge process is very similar to the charge process. During the discharge process the central capacitor, which begins at some high voltage, in this case 1700V, must be discharged into the output phases in a way such that the charge flowing onto each of the output phases is proportional to the desired current on each of the output phases. The output voltages in the given example are determined by the 50Hz 240V voltage source connected to the output phases, and for unity power factor output the output currents on each phase will be at a 50 Hz and in phase with the output voltages. FIG. 6 shows the voltages and possible desired currents on the output phases. If the discharge pulse happens at the time $t_d$ of FIG. 6, the output voltages Vo1, Vo2, and Vo3 will have the values 120V, −190V, and 70V respectively. The desired output currents Io1, Io2, and Io3 are 90A, −143A, and 53A respectively. At the time t3, the switches So1$p$ and So2$n$ are fired. The closing of these switches applies the voltage Vo1-Vo2, equal to 410V, to the central resonant loop consisting of the discharging inductor 40 and the central capacitor 22. The resulting voltage across the discharging inductor 40 causes current to flow in the loop defined by the discharging inductor 40, the central capacitor 22, the switch So2$n$, and filter capacitors $36_2$ and $36_1$, and the switch So1$p$. In Plot 4A of FIG. 4, the currents designated 4$g$ and 4$f$ show the currents flowing in the direction of the arrows at $35_1$ and $35_2$. During the period from t3 to t4, charge flows onto the output phases 1 and 2 from the central capacitor, causing the central capacitor voltage to decrease as shown by voltage 4$a$. At some time t4, the switch So3$p$ is fired. The firing of this switch causes the voltage Vo3-Vo1, equal to −60V, to be applied across the closed switch So1$p$ from anode to cathode such that the switch is reverse biased, and the current in switch So1$p$ is driven to zero, as shown by current 4$g$ of FIG. 4. The current that was flowing in So1$p$ is replaced by current flowing in So3$p$, represented by the current 4$h$ of FIG. 4. The voltage now applied to the central resonant section of the discharging inductor 40 and central capacitor 22 by the phase voltages is Vo3-Vo2, equal to 260V, and the loop through which current is flowing now includes the discharging inductor 40, the central capacitor 22, the switch So2$n$, the filter capacitors $36_2$ and $36_3$, and the switch So3$p$. When the voltage on the central capacitor becomes less than the voltage Vo3-Vo2 applied by the filter capacitors, the current in the discharging inductor 40 begins to decrease. At some time t5, before the current in the discharging inductor goes to zero but after the central capacitor voltage has gone below zero, the "freewheeling" switch 26 is fired. The negative voltage on the central capacitor reverse biases the freewheeling diode 24, causing the current in the central capacitor to go to zero, as shown by central capacitor current 4$b$ of FIG. 4. The current is rerouted through the switch 26, and the current in switch 26 is shown by current 4$i$ of FIG. 4. The resonant current loop now includes the discharging inductor 40, the switch 26, the switch So2$n$, the filter capacitors $36_2$ and $36_3$, and the switch So3$p$. The voltage Vo3$p$-Vo2$n$ applied by the filter capacitors to the discharging inductor causes the current to continue decreasing in the loop until it reaches zero. At time $t_6$, the currents have dropped to zero amplitude, all switches are or become nonconductive, and the apparatus has returned to the starting condition, ready for another cycle. The effect of firing the freewheeling switch 26 is to lock the central capacitor at whatever voltage it was at when the switch 26 was fired, while allowing the current in the resonant loop to continue flowing onto the output phases. The residual voltage Vr of the central capacitor for the next charge pulse is controlled in this way.

It should be understood that the described operation of the arrangement of FIG. 2 is but one possible mode of operation, namely AC-to-AC conversion, among many possible modes of operation described by Limpaecher et al., which include alternating-current to direct-current (AC-to-DC) rectification, DC-to-AC inversion, DC-DC power conversion, and volt-ampere-reactive (VAR) control. It should be further understood that the description of the operation of the arrangement of FIG. 2 is an example, for only a single cycle among cycles which occur recurrently, preferably at a rate which is much in excess of the cyclic rate of the underlying alternating voltage, as described at length by Limpaecher et al., and further that the timing parameters and the resultant current and voltage magnitudes change during the progress through the underlying cyclic rate of the alternating voltage.

A single charge-discharge cycle has been described, similar to those described by Limpaecher et al., among many such pulse cycles which would occur in typical AC-AC conversion as described in Limpaecher et al. To demonstrate the need for improvement in the Limpaecher et al. method, it is first helpful to show how the method of Limpaecher et al. can result in AC current waveforms on the input or output when many such pulse cycles are performed recurrently.

If the pulse cycles are varied over time such that the amounts of charge drawn into the input switching section 18 of FIG. 2 from each of the individual phase legs $15_1$, $15_2$, and $15_3$ approximate sinusoidal currents on those phase legs, it will be apparent to one skilled in the art that a correctly chosen input filter of inductive section 14 and capacitive section 16 can result in near-sinusoidal currents flowing on the three phase inputs to the device $12_1$, $12_2$, and $12_3$, depending on the values of the filter components chosen. For example, if the sinusoidal currents $6_{1a}$, $6_{2a}$, and $6_{3a}$ shown in plots 6b, 6c, and 6d of FIG. 6 are desired to be drawn from the power source through $12_1$, $12_2$, and $12_3$ of FIG. 2, it would be sufficient to a good approximation to draw the pulsed currents $6_{1b}$, $6_{2b}$, and $6_{3b}$ also shown in plots 6b, 6c, and 6d of FIG. 6, through the switching section phase legs $15_1$, $15_2$, and $15_3$. If the inductive and capacitive filters 14 and 16 are chosen correctly to damp out the switching frequency components of the harmonic spectrum of the current, the currents drawn from the power source will closely resemble the ideal currents $6_{1a}$, $6_{2a}$, and $6_{3a}$. Slight changes in phase or amplitude might result from the filter, but these can be anticipated by one skilled in the art and the currents $6_{1a}$, $6_{2a}$, and $6_{3a}$ that are to be approximated by the pulsed currents can be chosen accordingly to compensate. The challenge inherent in control of the switching section is to correctly approximate the desired sinusoidal currents $6_{1a}$, $6_{2a}$, and $6_{3a}$ with a train of individual pulses. The correct amount of charge that an approximating pulse on a given phase should contain at a given time should be equal to the amount of charge that would have flowed from the desired sinusoidal current on that phase at that time during the time period of one pulse. Therefore it is not enough to ensure, as was illustrated by FIG. 4, that the charge distribution between the phases during a pulse is equal to the ratio of the current distribution between the desired phase currents. To control the magnitudes of the desired currents the magnitude of charge drawn from each phase during the time period of a pulse must be controlled. This time period will be referred to as the "pulse period". A typical numerical example could involve the ideal sinusoidal currents $6_{1a}$, $6_{2a}$, and $6_{3a}$ having frequency 60 Hz and peak amplitude of 141A, corresponding to an RMS current per phase of 100A. If at the time that a given example pulse occurs the three desired currents have the values $I_{61a}$=20A, $I_{62a}$=111A, and $I_{63a}$=−131A, representing a phase angle in the three-phase current waveform of 172 degrees, and the pulses are being executed at a frequency of 2000 Hz with a pulse period of 500 us, then the charges that should be drawn in each pulse at that time should be the charges that would flow from the currents $I_{61a}$, $I_{62a}$, and $I_{63a}$ during the 500 us pulse period, or:

$$Q_{61b}=20A* 500us=0.010C \text{ (C stands for coulombs)}$$

$$Q_{62b}=111A* 500us=0.056C$$

$$Q_{63b}=-131A* 50us=-0.066C$$

These Q's represent the charge the must flow on each phase during the individual pulse in the example. The next pulse could occur at a phase angle of 185 degrees, in which case the ideal currents $I_{61a}$, $I_{62a}$, and $I_{63a}$ would be different, and so too the ideal Q's for that pulse would be different.

In Limpaecher, et al. the amount of charge that flows onto the central capacitor at each pulse is controlled with the use of the freewheeling switch mentioned above. This control is possible because the size of charge pulse depends in part on the residual voltage $V_r$ of the central capacitor at t0, and as described above the freewheeling switch arrangement 24 and 26 of FIG. 2 can be used to leave the central capacitor at some desired $V_r$ at the end of a discharge pulse. The amount of charge Q that flows onto the central capacitor during a charge pulse can be determined using energy calculations. If the central capacitor begins the charge at a voltage $V_r$, and the three filter capacitor voltages Vi1, Vi2, and Vi3 are, for example, 300V, −100V, and −200V, representing a phase angle of 101 degrees, to approximate the phase currents the charges $Q_1$, $Q_2$, and $Q_3$ drawn from each phase must be in the same ratios to the voltages. Thus the energy drawn from the three phases is:

$$E_{in}=Q_1 V1+Q_2 V2+Q_3 V3$$

where $Q_1$ is positive charge drawn from V1 and $Q_2$ and $Q_3$ are negative charges drawn from Vi2 and Vi3, and these charges $Q_2$ and $Q_3$ have a sum equal in magnitude but opposite to $Q_1$. The energy that passes onto the central capacitor after it reaches a final voltage $V_f$ after the charge pulse is:

$$E_{in}=\tfrac{1}{2}(C_c V_f^2 - C_c V_r^2)$$

where Cc is the capacitance of the central capacitor. The charge that passes onto the central capacitor must equal the positive charge $Q_1$ that flowed (also equal to $-Q_2-Q_3$), or:

$$C_c V_f - C_c V_r = Q_1.$$

It is then possible to solve for $V_f$ in terms of Vi1, Vi2, Vi3, and $V_r$, as:

$$V_f = 2[(Vi1-Vi2)(-Vi2/Vi1)+(Vi1-Vi3)(-Vi3/Vi1)]-V_r.$$

Because $V_f$ is a function of the input voltages (as they exist after the inductive filter) and the initial voltage $V_r$ of the central capacitor, and it is not possible to alter the input voltages coming from the fixed power supply 12, the amount of charge flowing onto the central capacitor each pulse must be controlled with $V_r$ via the freewheeling switch according to the methods described above and in Limpaecher et al.

The freewheeling switch has disadvantages. One disadvantage is simply the additional two more components: the freewheeling switch and the necessary freewheeling diode. These add cost, size, and complexity to the system, and each has thermal losses contributing to system energy inefficiency. A second disadvantage is that the freewheeling switch cannot always be fired at the end of a discharge pulse such that the current in the discharge inductor 40 is driven to zero. If the discharge pulse is flowing into a negative voltage on the output capacitors, and the central capacitor must resonate to a lower voltage than is seen on the output in order to differentially drive the current to zero in inductor 40, then eliminating the central capacitor from the circuit with the freewheeling switch will cause the current in inductor 40 to increase indefinitely while the voltage on the output capacitors is negative. This is because, with the freewheeling switch replacing the central capacitor in the loop, the current flow in the resonant loop no longer builds up voltage in the central section on the central capacitor which opposes the current flow.

In general, Limpaecher et al. describes a method by which a resonant charge transfer apparatus (RCTA) is used along with a differential and sequential resonant charge-interchange (DSCI) method to convert power from AC to DC, DC to DC, DC to AC, or AC to AC. The apparatus contains a "central" capacitor that is charged by drawing charge from input power terminals and then discharged by injecting charge into output power terminals. For AC three-phase power conversion the charge drawn from the input power terminals is drawn from each phase such that the charge drawn from a given phase is proportional to the current desired on that phase at the time the charge pulse occurs, and the charge injected into the output power terminals is injected into each output phase such that the charge injected into a given output phase is proportional to the current desired on that phase at the time the discharge pulse occurs.

During many of the charge and discharge cycles of the central capacitor the amount of charge flowing during each charge and discharge cycle can be controlled, according to Limpaecher et al., by the use of a freewheeling switch arrangement that allows a controller to select the voltage at which the central capacitor remains after a discharge cycle, and thus the voltage at which it begins each charge cycle. The freewheeling switch arrangement has disadvantages in cost, efficiency, and versatility.

SUMMARY OF THE INVENTION

An aspect of the present invention describes a control method that is used to operate an apparatus generally as described by Limpaecher et al. in U.S. Pat. No. 6,118,678 issued Sep. 12, 2000. The control method according to this mode of the method of the invention is used together with the method of operation described by Limpaecher et al. to obtain better control over the apparatus than is obtained using only the methods of Limpaecher et al.

An aspect of the present invention relates to a method by which the amount of charge flowing during each charge and discharge cycle can be controlled by selecting the phase shift of the input currents relative to the input voltages of the device.

A method according to an aspect of the invention is for transferring electric charge between a charge storage device and a first power terminal having a plurality of first-nodes includes the step of interchanging charge between the charge storage device and a first first-node of the plurality of first-nodes through an inductive section. When a predetermined charge has been interchanged between the charge storage device and the first first-node, the first first-node is replaced by a second first-node of the plurality of first-nodes. Charge is interchanged between the charge storage device and the second first-node through the inductive section. The ratio of the predetermined charge interchanged between the charge storage device and the first first-node and the charge interchanged between the charge storage device and the second first-node is equal to a ratio of the currents flowing in the first first-node and the second first-node. The magnitude of charge interchanged between the charge storage device and the first first-node and the magnitude of charge interchanged between the charge storage device and the second first-node are controlled by selecting the phase shift between the currents flowing in the first first-node and the second first-node and the voltages at the first first-node and the second first-node, respectively. In a particular mode of this method the ratio of the predetermined charge interchanged between the charge storage device and the first first-node and the charge interchanged between the charge storage device and the second first-node is equal to a ratio of the currents drawn from the first first-node and the second first-node, and the magnitude of charge interchanged between the charge storage device and the first first-node and the magnitude of charge interchanged between the charge storage device and the second first-node are controlled by selecting the phase shift between the currents drawn from the first first-node and the second first-node and the voltages at the first first-node and the second first-node, respectively.

A method according to another aspect of the invention is for transferring electric charge between a charge storage device and a first power terminal having a plurality of first-nodes. This method includes the step of interchanging charge between the charge storage device and a first first-node of the plurality of first-nodes through a first inductive section. When a predetermined charge has been interchanged between the charge storage device and the first first-node, the first first-node is replaced by a second first-node of the plurality of first-nodes. Charge is interchanged between the charge storage device and the second first-node through the first inductive section. The ratio of the predetermined charge interchanged between the charge storage device and the first first-node and the charge interchanged between the charge storage device and the second first-node is equal to a ratio of the currents flowing in the first first-node and the second first-node. The magnitude of charge interchanged between the charge storage device and the first first-node and the magnitude of charge interchanged between the charge storage device and the second first-node are controlled by selecting the phase shift between the currents flowing in the first first-node and the second first-node and the voltages at the first first-node and the second first-node, respectively. Charge is interchanged between the charge storage device and a first second-node of a plurality of second-nodes through a second inductive section. When a predetermined charge has been interchanged between the charge storage device and the first second-node, the first second-node is replaced by a second second-node of the plurality of second-nodes, and charge is interchanged between the charge storage device and the second second-node through the second inductive section. The ratio of the predetermined charge interchanged between the charge storage device and the first second-node and the charge interchanged between the charge storage device and the second second-node is equal to a ratio of the currents injected into the first second-node and the second second-node. The magnitude of charge interchanged between the charge storage device and the first second-node and the magnitude of charge interchanged between the charge storage device and the second second-node are controlled by choosing the phase shift between the currents drawn from the first second-node and the second second-node and the voltages at the first second-node and the second second-node.

A method according to yet another aspect of the invention is for transferring electric charge between a charge storage device and a first power terminal having a plurality of first-nodes. This method includes the step of interchanging charge between the charge storage device and a first first-node of the plurality of first-nodes through a first inductive section. When a predetermined charge has been interchanged between the charge storage device and the first first-node, the first first-node is replaced by a second first-node of the plurality of first-nodes. Charge is interchanged between the charge storage device and the second first-node through the first inductive section. The ratio of the predetermined charge interchanged between the charge storage device and the first first-node and the charge interchanged between the charge storage device and the second first-node is equal to a ratio of the currents flowing in the first first-node and the second first-node. The magnitude of charge interchanged between the charge storage device and the first first-node and the magnitude of charge interchanged between the charge storage device and the second first-node are controlled by selecting the phase shift between the currents flowing in the first first-node and the second first-node and the voltages at the first first-node and the second first-node, respectively. The charge is interchanged between the charge storage device and a first second-node of a plurality of second-nodes through an inductive section. When a predetermined charge has been interchanged between the charge storage device and the first second-node, the first second-node is replaced by a second second-node of the plurality of second-nodes. Charge is interchanged between the charge storage device and the second second-node through an inductive section. The ratio of the predetermined charge interchanged between the charge storage device and the first second-node and the charge interchanged between the charge storage device and the second second-node is equal to a ratio of the currents injected into the first second-node and the second second-node. The magnitude of charge interchanged between the charge storage device and the first second-node and the magnitude of charge interchanged between the charge storage device and the second second-node are controlled by choosing the phase shift between the currents drawn from the first second-node and the second second-node and the voltages at the first second-node and the second second-node, respectively. The interchanging of charge is performed through the first inductive section.

DESCRIPTION OF THE INVENTION

Figure 1:
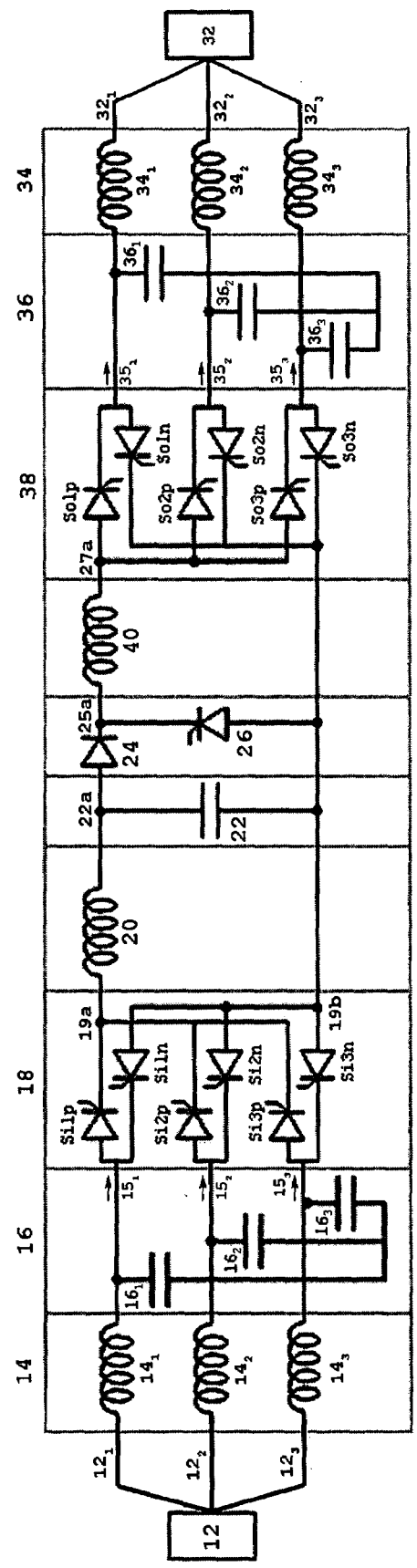
FIG. 1 is a simplified schematic diagram of the physical structure of a charge transfer apparatus such as that described at length in U.S. Pat. No. 6,118,678, issued Sep. 12, 2000 in the name of Limpaecher et al., incorporated herein by reference.

Aspects of the present invention provide a method for controlling the size of the charge pulses of the apparatus of Limpaecher et al. without using a freewheeling switch to control the residual voltage $V_r$ on the central capacitor before a charge cycle begins. The method is the phase shifting of the currents drawn from the input relative to the input voltages. The desired input currents on the three input phases, which are approximated in pulsed form over time by the pulses of charge drawn from said input phases, are chosen such that they are electrically phase shifted from the input voltages by some angular phase shift. A properly chosen phase shift can result, within limits, in a given total desired charge size for a charge pulse independent of what the initial $V_r$ of the central capacitor was at the beginning of the pulse. This eliminates the requirement for a freewheeling switch that controls $V_r$.

Phase shifting the desired input currents and thus input charges per pulse drawn from each phase allows control of the size of a central capacitor charge pulse because it allows control of the amount of energy passing onto the central capacitor per amount of charge. When the desired currents are in phase with the voltages as described above during operation with the freewheeling switch, that energy per charge is a fixed amount. In one example above, the phase voltages at a phase angle of 101 degrees were Vi1=300V, Vi2=−100V, and Vi3=−200V. The charge drawn from these phases without phase shifting the currents and voltages is $Q_1$ from Vi1, $Q_2$ from Vi2, and $Q_3$ from Vi3 such that $Q_2=Q_1(Vi2/Vi1)$ and $Q_3=Q_1(Vi3/Vi1)$, which is to say that the charges are drawn in the same ratio that the voltages exist in. The total energy coming from the input phases is $E_{in}=Vi1Q_1+Q_1(Vi2^2/Vi1)+Q_1(Vi3^2/Vi1)$. The energy change in the central capacitor as it charges from its initial voltage $V_r$ to its final voltage $V_f$ is $dE_{Cc}=\frac{1}{2}(C_cV_f^2-C_cV_r^2)$. Given the fixed nature of Vi1, Vi2, and Vi3 during a pulse due to the large capacitances of the filter capacitors, charge flows onto the central capacitor during the pulse until the energy $E_{in}$ drawn from the input by the charge $Q_1$ is equal to the energy $dE_{Cc}$ added to the central capacitor by that charge. At this point the pulse must be over because all energy drawn from the input has been transferred to the central capacitor and is thus not stored in any part in current in the loop in inductor 20. A fixed amount of energy has resulted in a fixed and uncontrollable amount of charge flowing onto the central capacitor given the initial central capacitor voltage $V_r$.

Phase shifting the currents relative to the input voltages alters the energy equation, because the charges $Q_1$, $Q_2$, and $Q_3$ no longer must be in the same ratios as the voltages Vi1, Vi2, and Vi3. Instead, they are in the ratios of new desired currents that are phase shifted from the voltages Vi1, Vi2, and Vi3 by some electrical angle Ø. To illustrate this we take the example of Vi1=300V, Vi2=−100V, and Vi3=−200V above, which occurs at 101 degrees in the AC cycle, and recall that for the zero Ø case the desired currents from each phase would have the same ratio between currents on each phase as the ratio between the voltages on each phase. However, if the desired currents are phase shifted by some angle, such as Ø=90 degrees, the ratios used are different. If the voltages are at 101 degrees in their AC cycle, the desired currents must be chosen to have the ratios between three-phase waveforms that exist at 191 degrees in the AC cycle. Instead of a 3:−1:−2 ratio for the currents on phases 1, 2, and 3, the currents on these phases exhibit a −1:5:−4 ratio, because that is the ratio between the three elements of any standard three-phase waveform at 191 electrical degrees. Therefore, during a charge pulse that occurs at approximately 101 degrees in phase angle of the voltage waveform, the charge passing from the three phases onto the central capacitor must be divided in the ratio −1:5:−4 between the three input phases respectively. If some nominal amount of charge $Q_{90}$ exists such that the charges drawn from the three phases are $-Q_{90}$, $5Q_{90}$, and $-4Q_{90}$ respectively, according to the correct ratios, then the energy drawn from the phases is:

Vi1($-Q_{90}$)+Vi2($5Q_{90}$)+Vi3($-4Q_{90}$)

Substituting the actual voltages, the energy drawn from the phases is:

300V($-Q_{90}$)−100V($5Q_{90}$)−200V($-4Q_{90}$)=$Q_{90}$(−300V−500V+800V)=0 J which is zero energy. It should be evident that phase shifting the desired input currents from the input voltages by 90 degrees results in zero energy draw from the input. In general, the power draw from an AC voltage source V by an AC current I is known to be $V_{rms}I_{rms}\cos(\theta)$ where θ is the phase shift between the voltage and current signals. In the case of the pulse-approximated currents of the apparatus of Limpaecher et al., this is also true. Because it is a three phase system, the power draw from the three input phases is 3VIcos(θ) where V is the rms phase to neutral voltage per phase, I is the rms current drawn from each phase, and θ is the phase shift between the voltage and current on each phase. The energy transfer to the central capacitor from the input phases is controllable by selecting the θ phase shift and thereby determining the cos(θ) factor.

Figure 8:
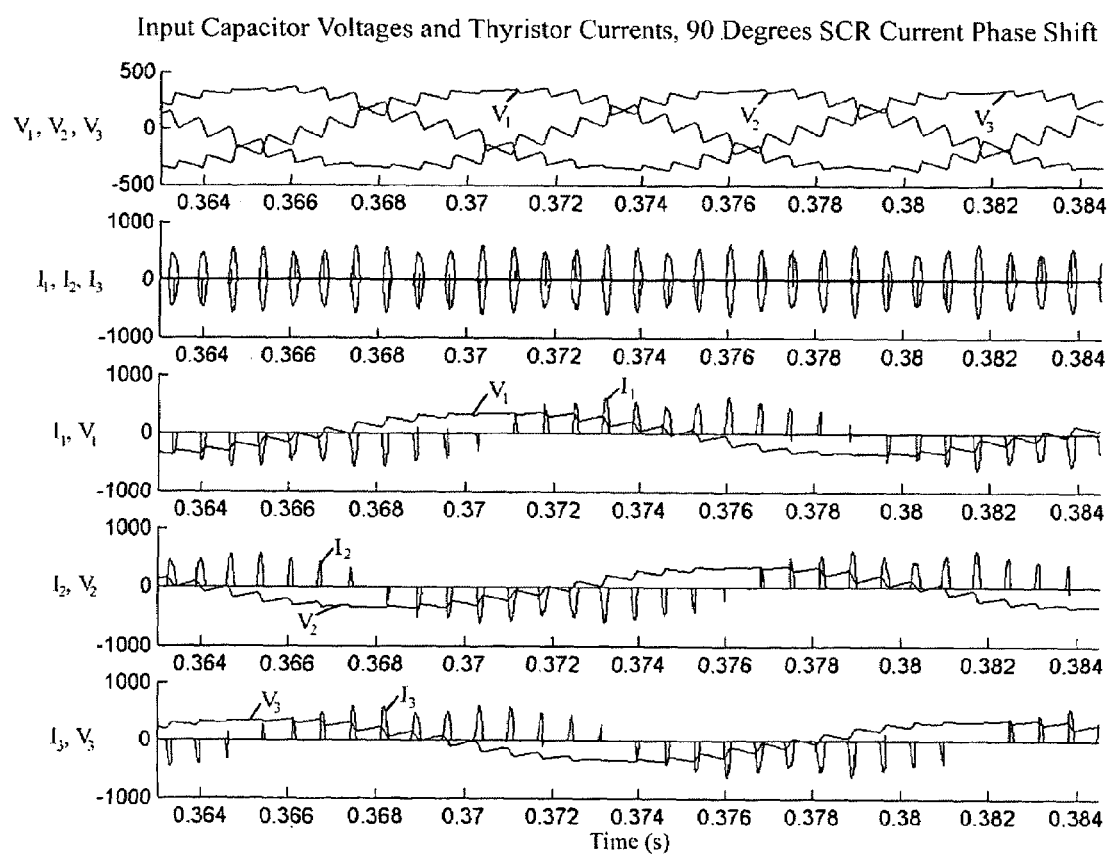
FIG. 8 shows voltages and pulsed currents on each phase of the input of the converter when the voltage and currents are out of phase by 90 electrical degrees.
Figure 9:
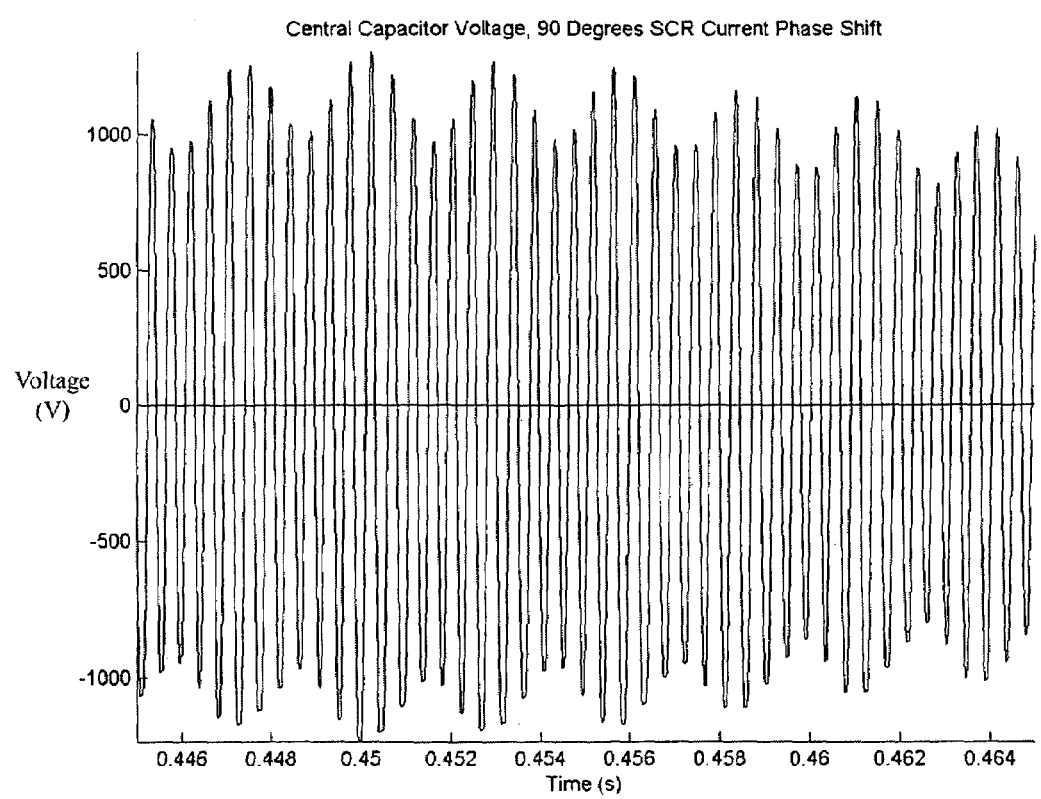
FIG. 9 shows the central capacitor voltage waveform when the voltage and currents on the input phases around out of phase by 90 electrical degrees.

This phase shifting is better illustrated through several FIGUREs which show cases of 0 degrees, 55 degrees, and 85 degrees of phase shifting between the input voltages and the input pulse approximated currents. FIG. 8 shows the three voltages on the first plot, the three pulsed phase currents on the second plot, and voltage and current plots combined for the three separate phases on the third, fourth, and fifth plots. It should be clear to one skilled in the art that the pulsed currents are phase shifted by roughly 90 degrees from the voltages on each phase, which is to say that there is an approximately 90 degrees phase shift between voltage and current. The waveform of the central capacitor is shown on FIG. 9. The central capacitor waveform is centered around zero volts vertically, which shows that the charge process adds zero energy to the capacitor. If $V_f$ and $V_r$ of the central capacitor are the same, then the capacitor contains the same energy before and after the charge pulse. In the operation illustrated by FIGS. 8 and 9 the charge process has been controlled to add roughly 1800V of charge to the central capacitor with the given Vr by adding zero energy.

Figure 10:
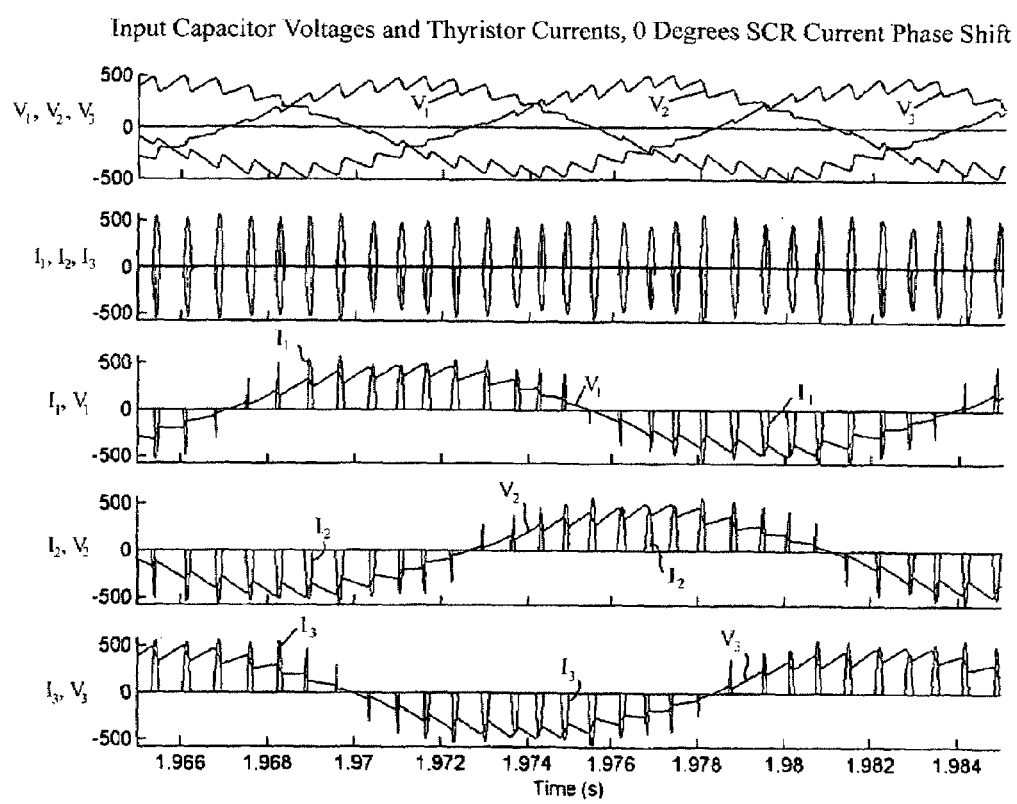
FIG. 10 shows voltages and pulsed currents on each phase of the input of the converter when the voltage and currents are out of phase by 0 electrical degrees.
Figure 11:
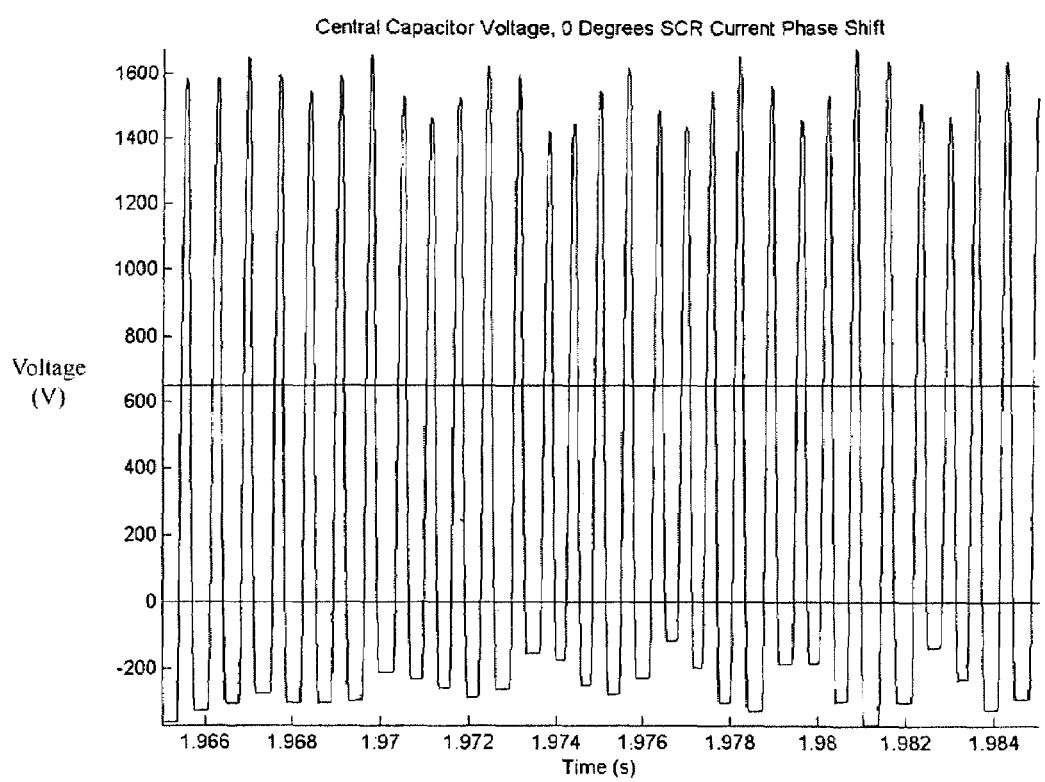
FIG. 11 shows the central capacitor voltage waveform when the voltage and currents on the input phases around out of phase by 0 electrical degrees.

Now let us see how 1800V of charge can be added to the central capacitor given a different $V_r$, of say −200V. FIG. 10 shows a central capacitor waveform charging from −200V to 1800V. This swing of the central capacitor is achieved by charging the capacitor with Qs that have been phase shifted from the input voltages by 0 degrees, thus adding energy to the central capacitor with a factor of cos(0), or unity. FIG. 11 shows the pulse currents and voltages for this case.

Figure 12:
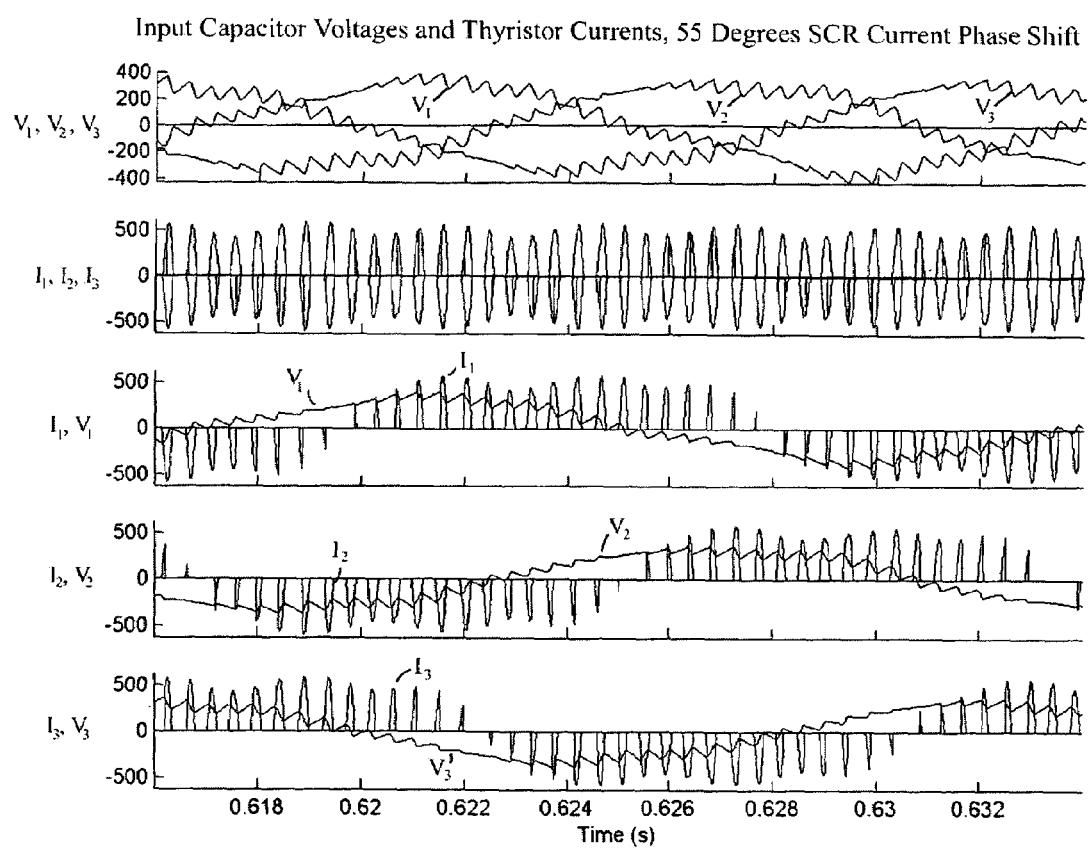
FIG. 12 shows voltages and pulsed currents on each phase of the input of the converter when the voltage and currents are out of phase by 55 electrical degrees.
Figure 13:
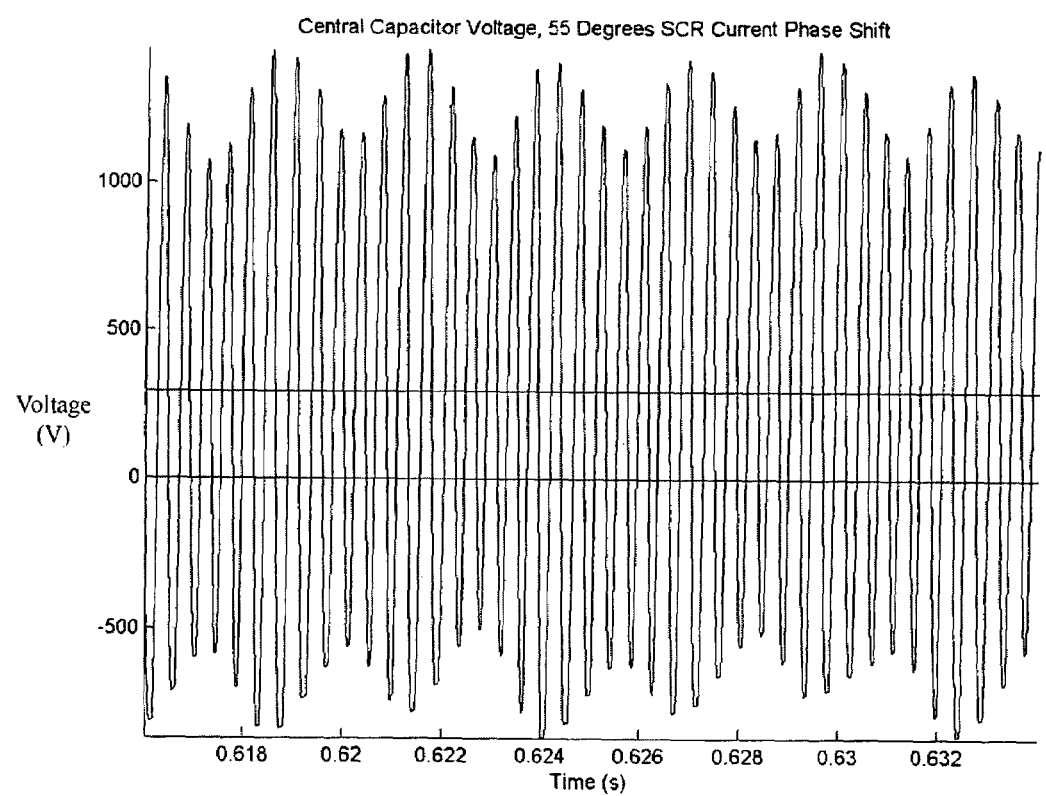
FIG. 13 shows the central capacitor voltage waveform when the voltage and currents on the input phases around out of phase by 55 electrical degrees.

The final case is shown in FIG. 12, where the pulsed currents and voltages on the input are phase shifted by about 55 degrees. The cos factor of cos(55)=0.57 shows that some intermediate amount of energy will be added to the central capacitor by this process, in between the zero energy added by the 90 degree phase shifted pulses (zero energy added) and the 0 degree phase shifted pulses (½$C_c$((1800V)2−(−200V)2)=1,600,000J energy added). The central capacitor waveform, shown in FIG. 13, oscillates roughly between −550V and 1450V. This signifies energy added per pulse of ½$C_c$ ((1450V)2−(−550V)2)=900,000J, or different from the 0 degree case by about the 0.57 cos factor.

The resulting method for controlling the amount of charge that flows onto the central capacitor during a charge pulse using phase shifting of the currents is to determine the amount of energy that would be added by a zero degree phase shifted pulse given the initial $V_r$, and, given a desired size of the charge pulse and thus desired final central capacitor voltage Vf, calculate the actual amount of energy that must flow onto the central capacitor from the input:

$E_{desired}=½C_c(V_f2-V_r2)$

The fraction $E_{desired}/E_{0\ degrees}$ must equal the cosine factor cos(Ø), or, solving for Ø, the phase shift is:

Ø=arccos($E_{desired}/E_{0\ degrees}$). Raising or lowering this factor cos(Ø) will cause more or less charge to flow onto the central capacitor during each pulse. A simple feedback controller can be created to raise cos(Ø) slowly over many pulses if the amount of charge is lower than desired and lower cos(Ø) if the amount of charge is greater than desired. This has been found to be the most stable mode of controlling the central capacitor average voltage change per pulse by selecting the phase angle. The feedback controller can use standard proportional integral derivative control, among other methods of control, on the phase shift to obtain the desired average voltage chance per pulse on the central capacitor, and thus average charge flowing onto the central capacitor per pulse from the input phases. It is very desirable to control the charging of the central capacitor to control the amount of current flowing through the apparatus and to guard against damage to system components.

Figure 2:
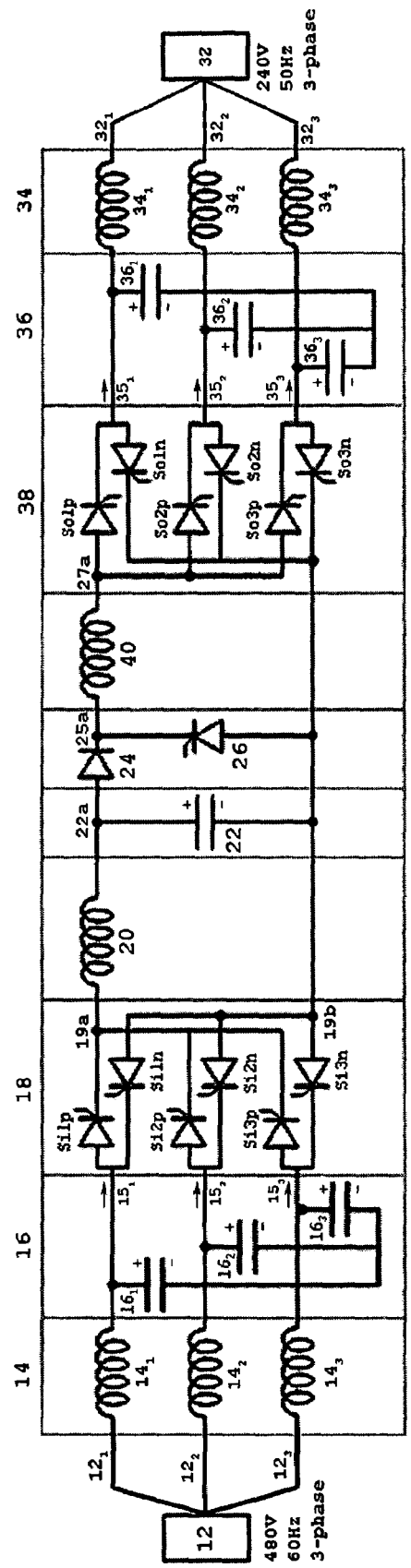
FIG. 2 is a schematic of an apparatus like the apparatus of FIG. 1, but with the addition of labeled input and output voltage sources.
Figure 3:
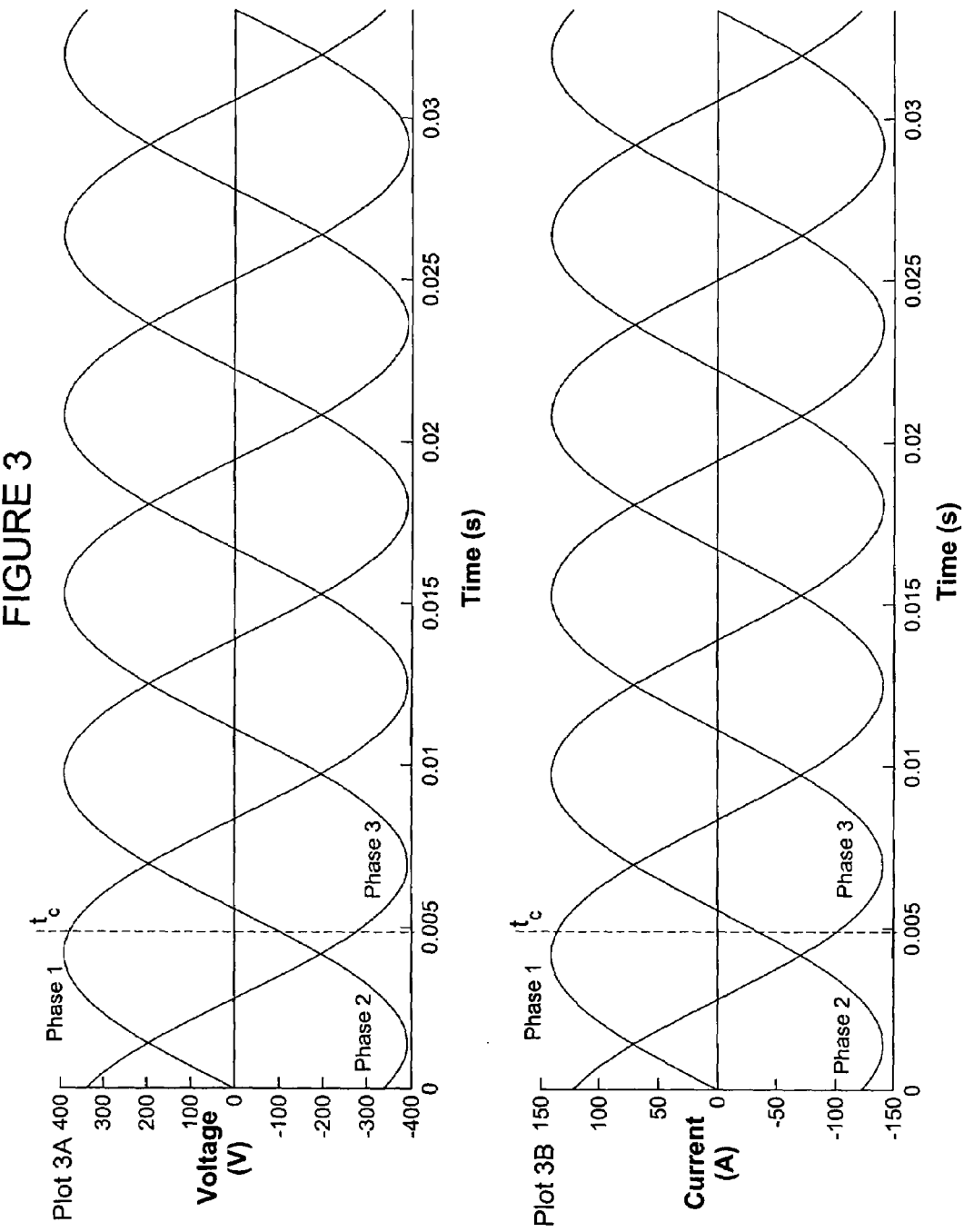
FIG. 3 shows three-phase voltage and current waveforms that could exist on the input of the apparatus of FIG. 2.
Figure 4:
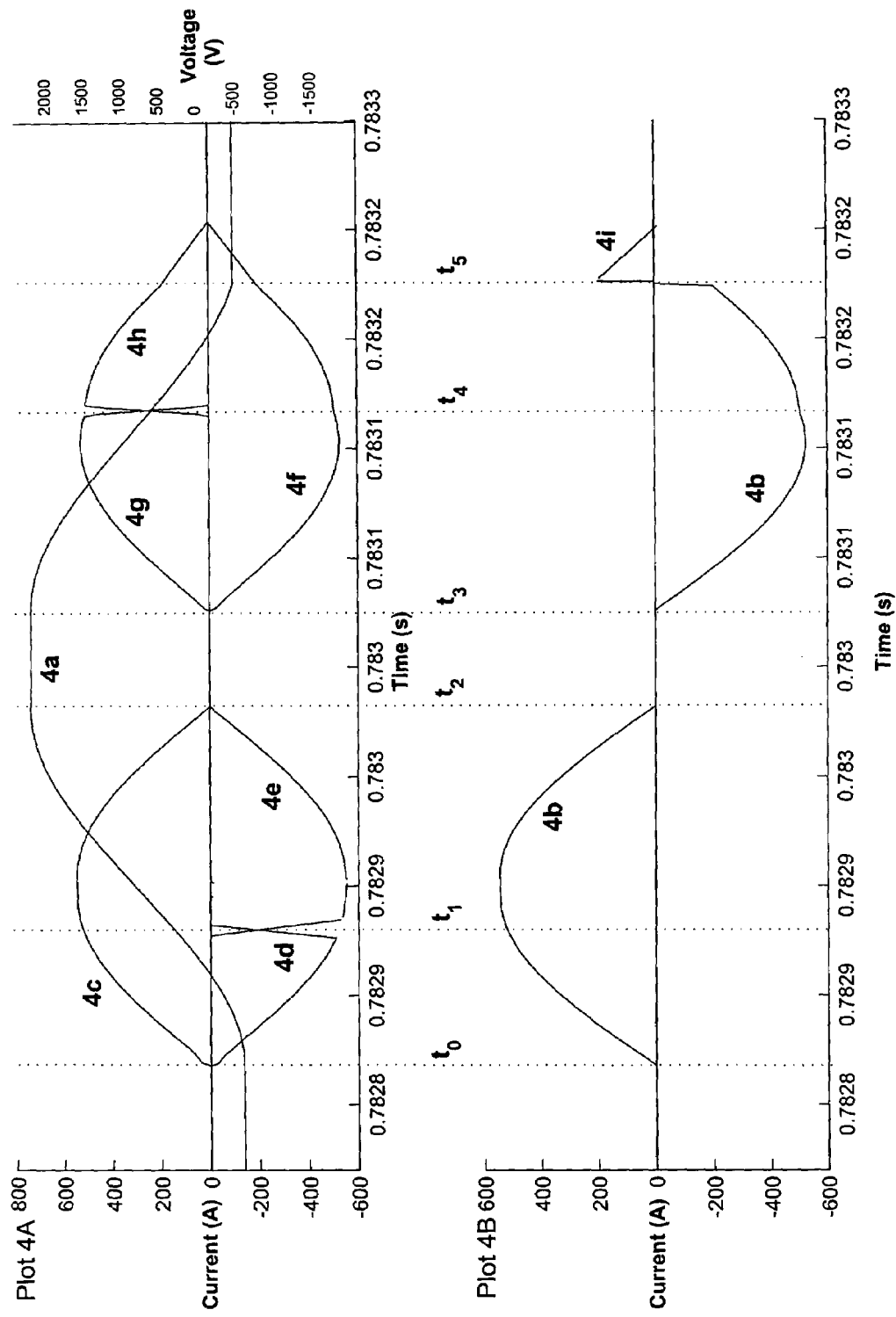
FIG. 4 shows current and voltage waveforms during one charge-discharge cycle of the central capacitor of the converter.
Figure 5:
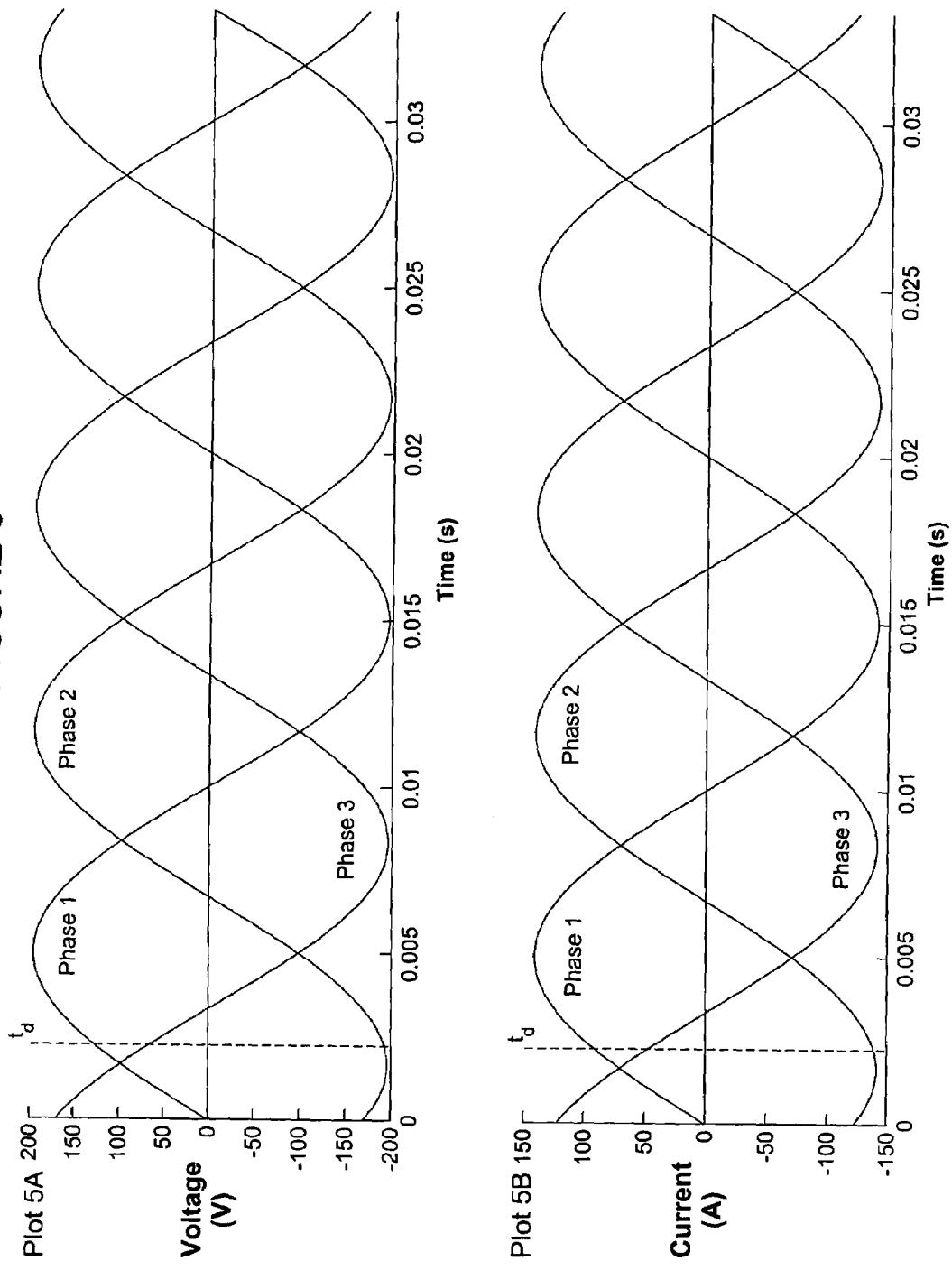
FIG. 5 shows current and voltage waveforms over many charge-discharge cycles of the central capacitor of the converter.
Figure 6:
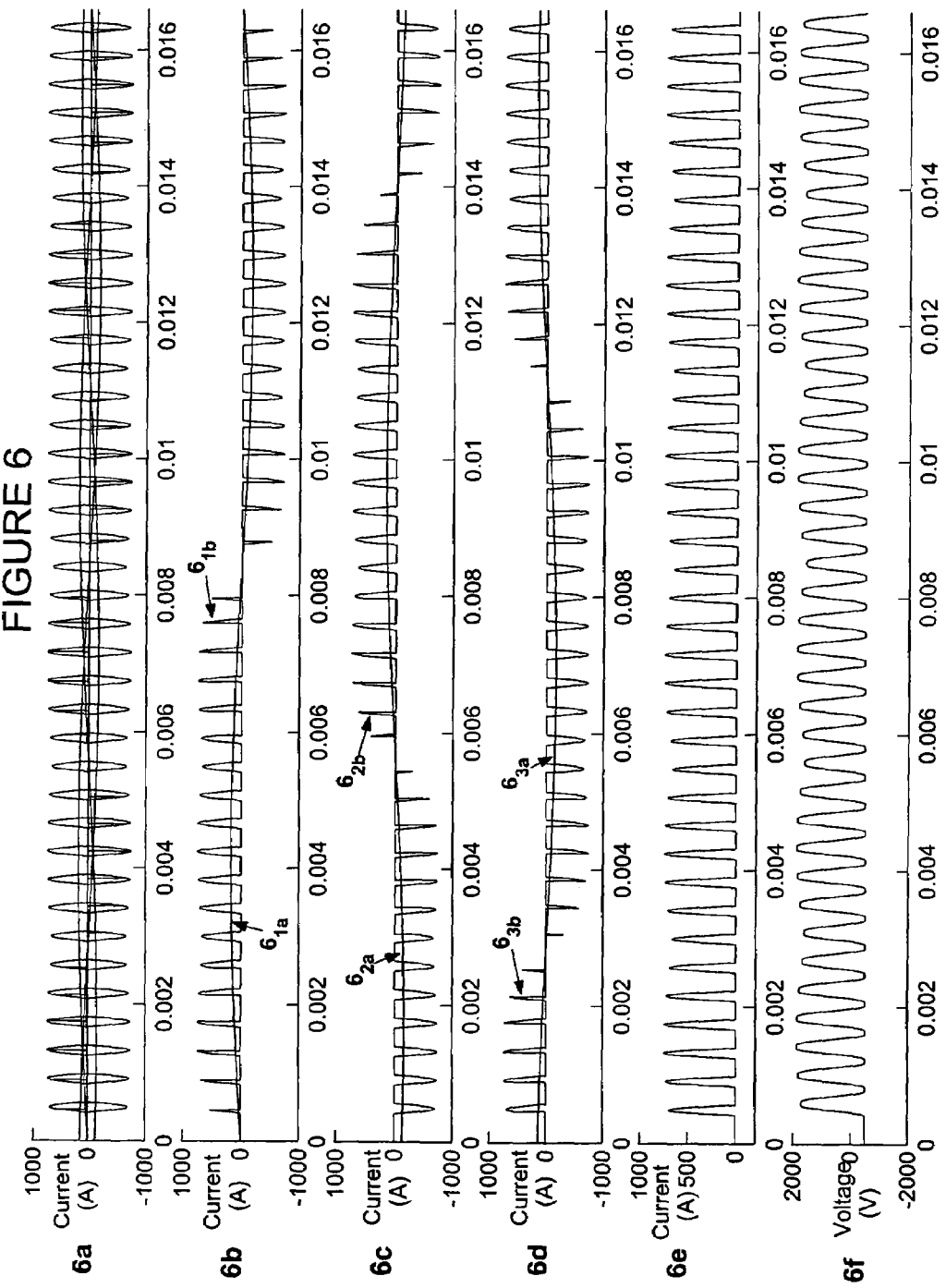
FIG. 6 shows three-phase voltage and current waveforms that could exist on the output of the apparatus of FIG. 2.
Figure 7:
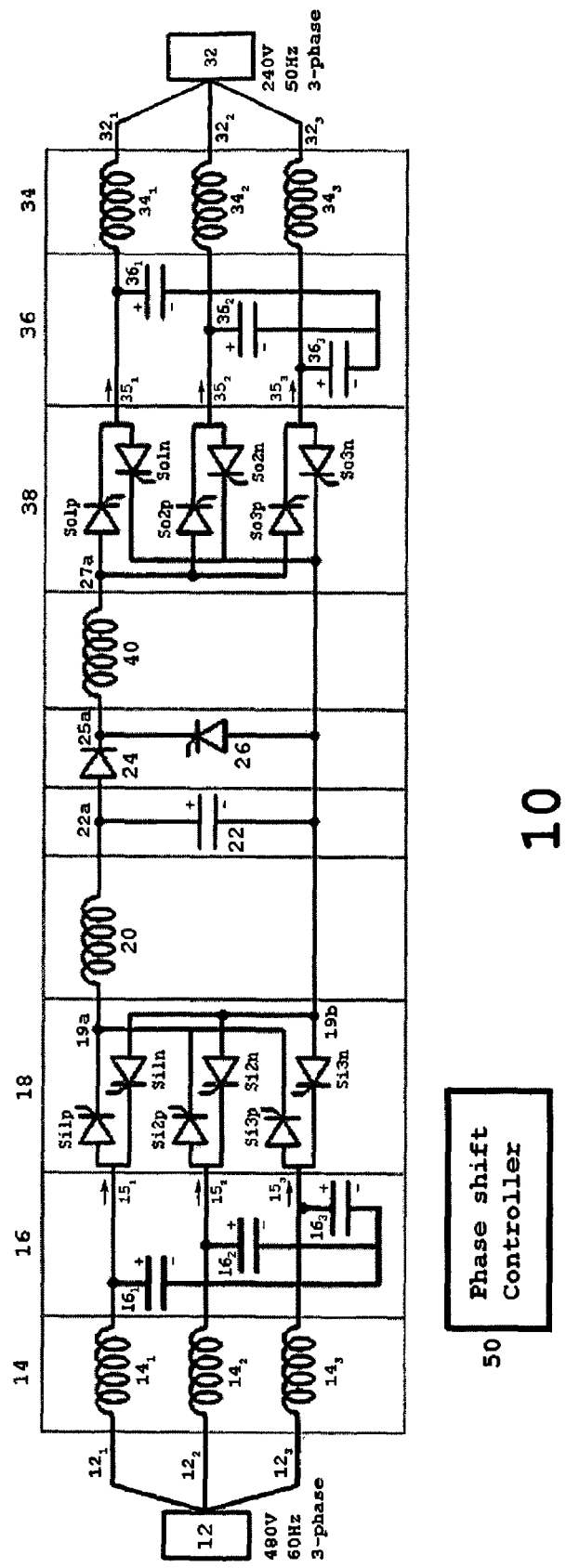
FIG. 7 shows an apparatus like the apparatus of FIG. 2, but with the addition of a phase controller that selects the phase angle of the input currents relative to the input voltages according to aspects of the present invention.

Phase control of the switches according to the present invention is provided by a phase control block 50 shown on FIG. 7 together with the apparatus of FIG. 2. In order to select input phase currents that are phase shifted from the voltages it is necessary to measure the present phase angle of the three-phase voltages, and this trigonometric calculation should be well understood by one skilled in the art.

According to Limpaecher et al., the converter allows for bi-directional power flow, and due to this fact, as mentioned above, the labels of "input" and "output" for opposite ends of the converter are arbitrary. Because of this feature the methods of the present invention may be applied either to the phase shifting of the input voltage and currents relative to each other to control the central capacitor voltage or to the phase shifting of the output voltage and currents relative to each other to control the central capacitor voltage.

While the invention contemplates a mode of operation that eliminates the need for the freewheeling arrangement 24 and 26 of FIG. 1, it is possible to use methods according to the invention while the freewheeling diode arrangement is in-circuit. When using the method according to the invention in the presence of the freewheeling arrangement, switch 26 should be maintained in the off (non-conducting) state. Some losses may be experienced due the presence of diode 24 and switch 26.

What is claimed is:

1. A method of transferring electric charge between a charge storage device and a first power terminal having a plurality of first-nodes, said method comprising:
   interchanging charge between the charge storage device and a first first-node of the plurality of first-nodes through an inductive section;
   when a predetermined charge has been interchanged between the charge storage device and the first first-node, replacing the first first-nodes by a second first-node of the plurality of first-nodes;
   interchanging charge between the charge storage device and the second first-node through the inductive section;
   wherein the ratio of the predetermined charge interchanged between the charge storage device and the first first-node and the charge interchanged between the charge storage device and the second first-node is equal to a ratio of the currents flowing in the first first-node and the second first-node;
   wherein the magnitude of charge interchanged between the charge storage device and the first first-node and the magnitude of charge interchanged between the charge storage device and the second first-node are controlled by selecting the phase shift between the currents flowing in the first first-node and the second first-node and the voltages at the first first-node and the second first-node, respectively.

2. A method according to claim 1, wherein the ratio of the predetermined charge interchanged between the charge storage device and the first first-node and the charge interchanged between the charge storage device and the second first-node is equal to a ratio of the currents drawn from the first first-node and the second first-node; and
   wherein the magnitude of charge interchanged between the charge storage device and the first first-node and the magnitude of charge interchanged between the charge storage device and the second first-node are controlled by selecting the phase shift between the currents drawn from the first first-node and the second first-node and the voltages at the first first-node and the second first-node, respectively.

3. A method of transferring electric charge between a charge storage device and a first power terminal having a plurality of first-nodes, said method comprising:
   interchanging charge between the charge storage device and a first first-node of the plurality of first-nodes through a first inductive section;
   when a predetermined charge has been interchanged between the charge storage device and the first first-node, replacing the first first-nodes by a second first-node of the plurality of first-nodes;
   interchanging charge between the charge storage device and the second first-node through said first inductive section;
   wherein the ratio of the predetermined charge interchanged between the charge storage device and the first first-node and the charge interchanged between the charge storage device and the second first-node is equal to a ratio of the currents flowing in the first first-node and the second first-node;
   wherein the magnitude of charge interchanged between the charge storage device and the first first-node and the magnitude of charge interchanged between the charge storage device and the second first-node are controlled by selecting the phase shift between the currents flowing in the first first-node and the second first-node and the voltages at the first first-node and the second first-node, respectively;
   interchanging charge between the charge storage device and a first second-node of a plurality of second-nodes through a second inductive section;
   when a predetermined charge has been interchanged between the charge storage device and the first second-node, replacing the first second-node by a second second-node of the plurality of second-nodes; and
   interchanging charge between the charge storage device and the second second-node through the second inductive section;
   wherein the ratio of the predetermined charge interchanged between the charge storage device and the first second-node and the charge interchanged between the charge storage device and the second second-node is equal to a ratio of the currents injected into the first second-node and the second second-node; and
   wherein the magnitude of charge interchanged between the charge storage device and the first second-node and the magnitude of charge interchanged between the charge storage device and the second second-node are controlled by choosing the phase shift between the currents drawn from the first second-node and the second second-node and the voltages at the first second-node and the second second-node.

4. A method of transferring electric charge between a charge storage device and a first power terminal having a plurality of first-nodes, said method comprising:
   interchanging charge between the charge storage device and a first first-node of the plurality of first-nodes through a first inductive section;
   when a predetermined charge has been interchanged between the charge storage device and the first first-node, replacing the first first-nodes by a second first-node of the plurality of first-nodes;
   interchanging charge between the charge storage device and the second first-node through said first inductive section;
   wherein the ratio of the predetermined charge interchanged between the charge storage device and the first first-node and the charge interchanged between the charge storage device and the second first-node is equal to a ratio of the currents flowing in the first first-node and the second first-node;
   wherein the magnitude of charge interchanged between the charge storage device and the first first-node and the magnitude of charge interchanged between the charge storage device and the second first-node are controlled by selecting the phase shift between the currents flowing in the first first-node and the second first-node and the voltages at the first first-node and the second first-node, respectively;
   interchanging charge between the charge storage device and a first second-node of a plurality of second-nodes through an inductive section;
   when a predetermined charge has been interchanged between the charge storage device and the first second-node, replacing the first second-node by a second second-node of the plurality of second-nodes; and interchanging charge between the charge storage device and the second second-node through an inductive section;

wherein the ratio of the predetermined charge interchanged between the charge storage device and the first second-node and the charge interchanged between the charge storage device and the second second-node is equal to a ratio of the currents injected into the first second-node and the second second-node;

wherein the magnitude of charge interchanged between the charge storage device and the first second-node and the magnitude of charge interchanged between the charge storage device and the second second-node are controlled by choosing the phase shift between the currents drawn from the first second-node and the second second-node and the voltages at the first second-node and the second second-node, respectively; and wherein interchanging of charge is performed through said first inductive section.

* * * * *